United States Patent [19]

Economy et al.

[11] Patent Number: 4,499,122

[45] Date of Patent: Feb. 12, 1985

[54] PROCESS FOR FINISHING SURFACES ACHIEVING IMPROVED MAGNETIC DISK PERFORMANCE

[75] Inventors: James Economy, San Jose; Anagnostis E. Zachariades, Hillsborough, both of Calif.

[73] Assignee: International Business Machines Corporation, Armonk, N.Y.

[21] Appl. No.: 528,318

[22] Filed: Aug. 31, 1983

[51] Int. Cl.³ .............................................. H01F 10/00
[52] U.S. Cl. ..................................... 427/130; 427/128
[58] Field of Search .............................. 427/127–132, 427/48

[56] References Cited

U.S. PATENT DOCUMENTS

| 2,688,567 | 9/1954 | Frank ................................ | 427/130 |
| 3,622,386 | 8/1968 | Larsen ............................... | 117/235 |
| 4,410,565 | 10/1983 | Kitamoto et al. .................. | 427/130 |

Primary Examiner—Bernard D. Pianalto
Attorney, Agent, or Firm—Walter J. Madden, Jr.; Henry E. Otto, Jr.

[57] ABSTRACT

A method for improving the durability, surface finish, and magnetic properties of a magnetic recording disk, the recording disk having a magnetic coating material with load bearing particles therein, by applying thereto a deformational force which exceeds the elastic limit of the coating material.

7 Claims, 8 Drawing Figures

ROLLED EPOXY-COATED DISK

UNBUFFED EPOXY-COATED DISK

BUFFED EPOXY-COATED DISK

ROLLED EPOXY-COATED DISK

SURFACE FINISH OF POLYURETHANE DISKS BEFORE ROLLING

SURFACE FINISH OF POLYURETHANE DISKS AFTER ROLLING

PROCESS FOR FINISHING SURFACES ACHIEVING IMPROVED MAGNETIC DISK PERFORMANCE

CROSS REFERENCE TO RELATED APPLICATION

Copending application Ser. No. 528,351, filed concurrently herewith on Aug. 31, 1983, discloses a method for modifying the surface finish of materials through the use of pressure rollers without changing the bulk properties of the materials.

BACKGROUND OF THE INVENTION

1. Field of Invention

This invention relates to a one step process for achieving greatly improved magnetic recording disks with far superior wear resistance, magnetic performance, and surface finish.

2. Description of Prior Art

It is well known in the art to increase the durability of coatings by adding thereto particles of some type of extremely hard material such as $Al_2O_3$. One example is the manufacture of magnetic recording disks employing a coating having magnetic particles and a small percentage of load bearing particles such as $Al_2O_3$, typically larger in diameter than the final coating thickness. Such a magnetic disk customarily is made of a metallic substrate member (thickness $\leq 153$ mils) such as an AlMg alloy on which a magnetic recording layer (thickness $\leq 1$–$1.5\mu$) is deposited. It is very difficult to design a wear resistant surface where the hard particles are planar to the surface. There are problems in getting a monodispersed powder, as well as tendencies for the resin binder to conform over the hard $Al_2O_3$ particles.

After applying the magnetic coating layer containing the load bearing particles to the substrate and curing the coating, a buffing or polishing operation follows to ultrafinish the surface of the magnetic coating layer. Such buffing is time consuming, generates debris, and furthermore, removes almost 40% of the magnetic material from the recording layer, thereby reducing the effective magnetic properties of the finished recording layer. Also, some of the load bearing particles may be torn out of the coating during buffing, but some invariably end up protruding above the coating surface after polishing. This latter feature is thought to be highly desirable in protecting the magnetic coating from damage associated with contact with the head and corresponding loss of information.

SUMMARY OF THE INVENTION

In accordance with the present invention, a magnetic disk product containing load bearing particles, such as $Al_2O_3$, is produced by a surface deformation technique. Such a disk product is produced through static pressure means or dynamic pressure rollers to produce a disk having an unexpectedly high coating durability, improved magnetic qualities, improved surface finish and improved coating curing time, without any significant change in other physical properties of the coating.

DESCRIPTION OF THE PREFERRED EMBODIMENT

Figure 1:
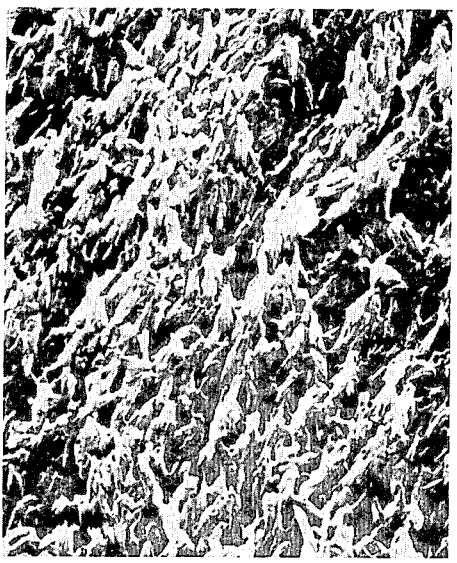
FIGS. 1-7 are photographs from a scanning electron microscope (SEM) showing comparisons of disks produced in accordance with the present invention with prior art disks.

Disks for use in the present invention may be fabricated in accordance with any suitable manner such as by applying a liquid magnetic coating material to a substrate by spin coating, the coating material containing a suitable binder system, magnetic particles and load bearing particles. In conventional disk manufacture, the applied coating material is heated to cure the binder system prior to a polishing operation.

In the present invention, the desired surface deformation is produced through the action of either static pressure means (particularly adapted for smaller diameter disks) or through pressure roller members having ultra-smooth hard surfaces which bear against the surfaces to be deformed. In a preferred embodiment, the roller members are a pair of rotating conical rollers having ultra-smooth surfaces (1 microinch or more) of a hardness greater than that of the binder and substrate. The member to be treated is placed between the rollers, rotation of the conical rollers resulting in rotation of the treated member between the rollers synchronously with the rollers and at the same angular velocity as the rollers.

The pressure applied by the rollers is sufficient to exceed the elastic limit of the surfaces being treated so as to result in irreversible deformation of the treated surfaces. In addition, these rollers can be adjusted to conform and provide a uniform load to surfaces which have a thickness ramp, such as many current magnetic recording disks produced by spin coating. Another important aspect of this invention is that the plastic deformation occurs not only within the magnetic coating, but is sufficient to push the much harder $Al_2O_3$ particles into the surface of the Al substrate so that the $Al_2O_3$ surface is flush with that of the magnetic coating. In this way, the $Al_2O_3$ appears to become more firmly anchored into the binder and metal substrate, and hence is reinforced more effectively and better able to protect the surface against contact with the head.

This invention may be used to ultrafinish surfaces of polymer magnetic coatings containing $Al_2O_3$ on either metal or polymer disk substrates by cold rolling through conical rollers. The concept has been demonstrated with substrate disks of an aluminum-magnesium alloy coated with an epoxy-phenolic resin containing magnetic $Fe_2O_3$ particles and load bearing $Al_2O_3$ particles. It has also been demonstrated on disks coated with a polyurethane binder system containing magnetic $Fe_2O_3$ particles and load bearing $Al_2O_3$ particles.

In one series of experiments, coated, unbuffed 8 inch diameter disks were rolled between conical rollers under loads varying from 100 to 400 pounds for 120 disk revolutions per minute or less. As is apparent, the number of disk revolutions during rolling is a function of the roller velocity. As a general rule, the higher the temperature at which the rolling is done, the fewer the total number of disk revolutions which are required to produce the desired modification of the surface properties. Experiments have been conducted at temperatures from room temperature to over 200° C. Higher temperatures are preferred with binders such as epoxies and polyurethanes because they sharply reduce the required rolling time, simultaneously permitting curing of the resins, and permitting operation at temperatures where the substrate has a lower yield stress. This ability to effect curing of the coating while also performing the rolling operation is an important factor in reducing overall process time, since prior art processes required curing to be completed before beginning polishing. In fact, some prior art processes actually "overcured" the coating so as to make it more brittle to facilitate polishing.

Figure 8:
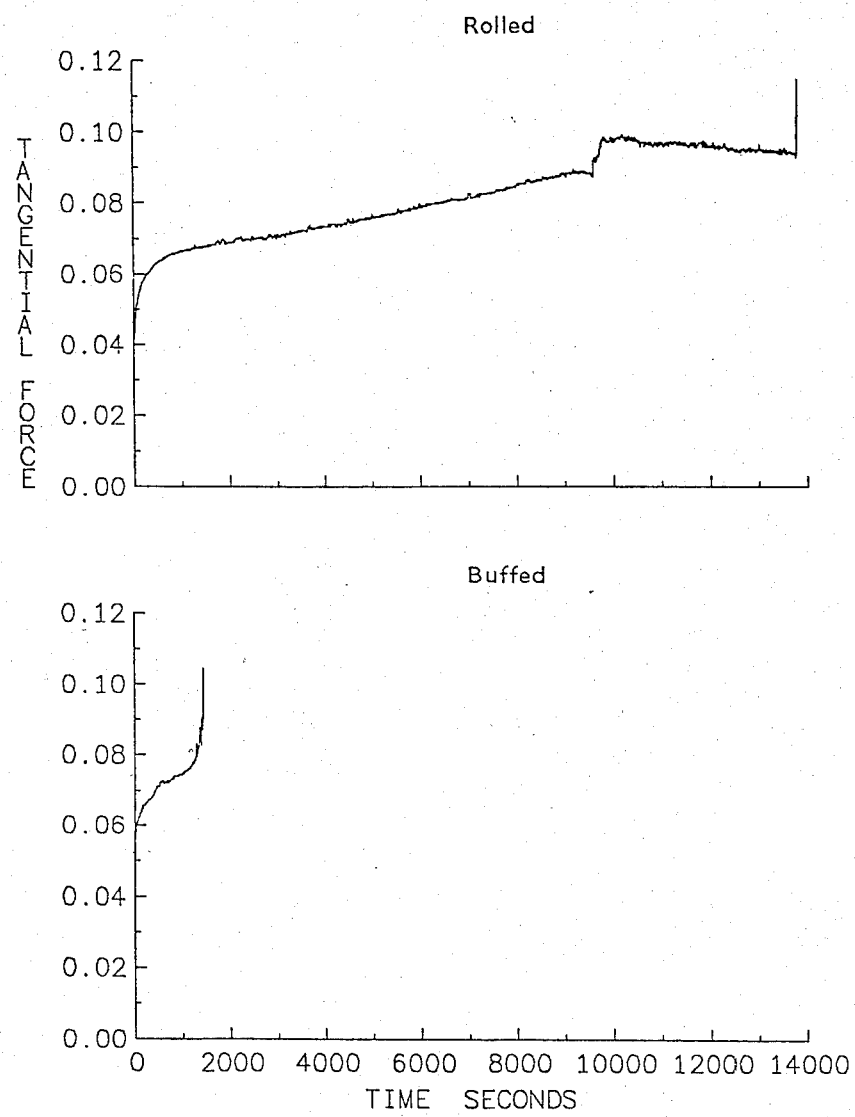
FIG. 8 contains graphs showing the durability of a magnetic recording disk treated in accordance with the present invention compared to a buffed disk.

The graphs of FIG. 8 show the unexpected increase in durability of a disk coating, in contrast to the durability of a conventionally buffed disk. The disks were tested using a Pin-On-Disk probe which is loaded against the disk to be tested as the disk rotates, and the time that is required for the probe to wear completely through the coating to the substrate is measured, longer times being an indication of more durable disks. It can be seen from FIG. 8 that the conventionally buffed disk coating had a relatively short durability life of 1500 seconds, while the disk coating treated in accordance with the present invention had a much extended life of 1400 seconds, a factor of almost 10 to 1.

One explanation for the unexpected durability of disks treated in the manner taught by the present invention is as follows. After conventional polishing of a disk coating, a number of $Al_2O_3$ particles, which are larger than the gamma $Fe_2O_3$ particles, protrude above the coating surface and can be struck by the test probe (or by a flying magnetic head slider in the case of use in a conventional disk file environment). This repeated contact can ultimately result in the $Al_2O_3$ particles being torn from the magnetic coating, thereby greatly reducing the coating durability.

In contrast to this, in coatings processed in accordance with this invention, the rolling operation forces the protruding $Al_2O_3$ particles back into the coating, and even into the substrate, so that the particles are more firmly anchored in the coating so as to continue to provide their desired load bearing function. As part of this invention, the $Al_2O_3$ particles do not have to completely be embedded in the surface. The degree to which the particles protrude can be controlled during the rolling process, to within the limits of the surface finish of the conical rolls, and this may afford other advantages in disk performance such as lube retention.

Figure 2:
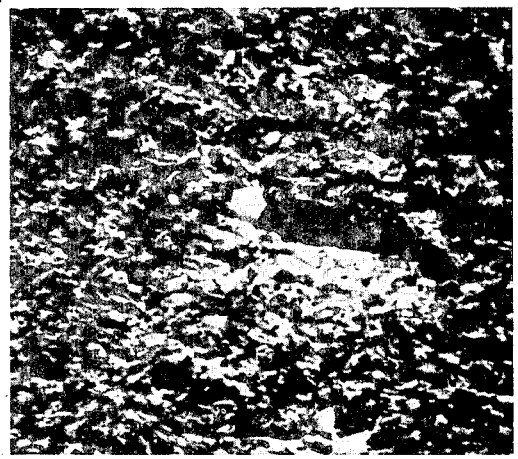
Figure 3:
Figure 4:
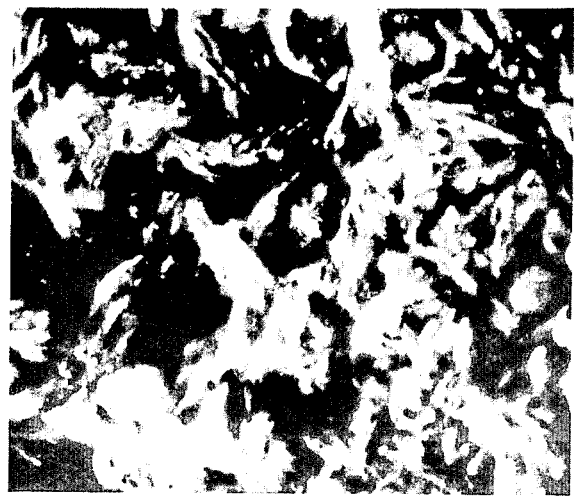

The SEM photographs of FIGS. 1, 2 and 3 graphically illustrate the effectiveness of the present invention in modifying the surface properties of an epoxy coated disk as an alternate to buffing. FIG. 1 shows the surface of the cured epoxy disk prior to buffing, while FIG. 2 illustrates that surface after conventional buffing. In contrast to FIG. 2, FIG. 3 shows the appearance of the epoxy disk after treatment in accordance with the present invention, clearly illustrating the unexpected and superior surface finish obtained.

Figure 5:
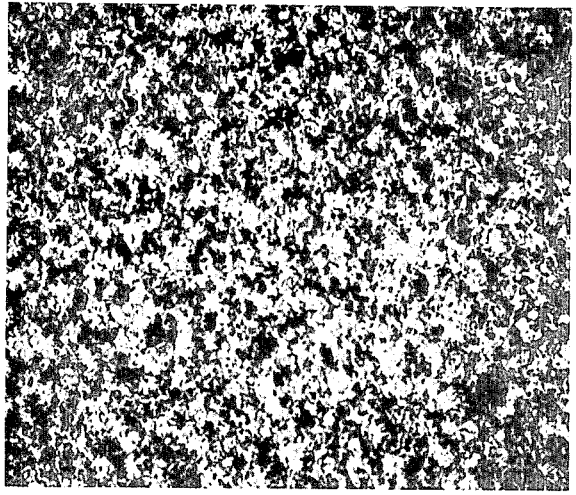
Figure 7:
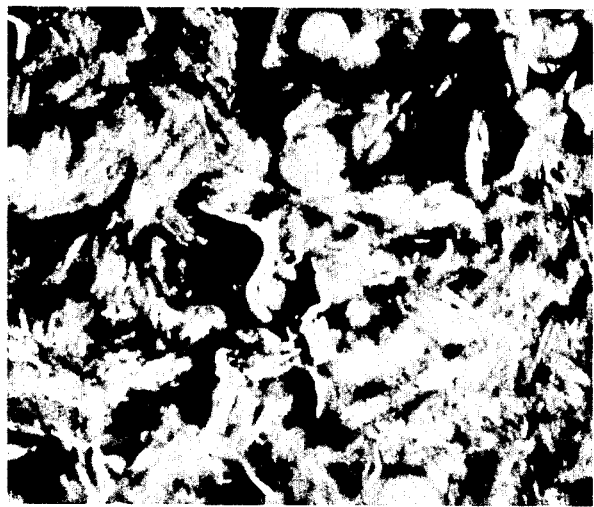
Figure 6:
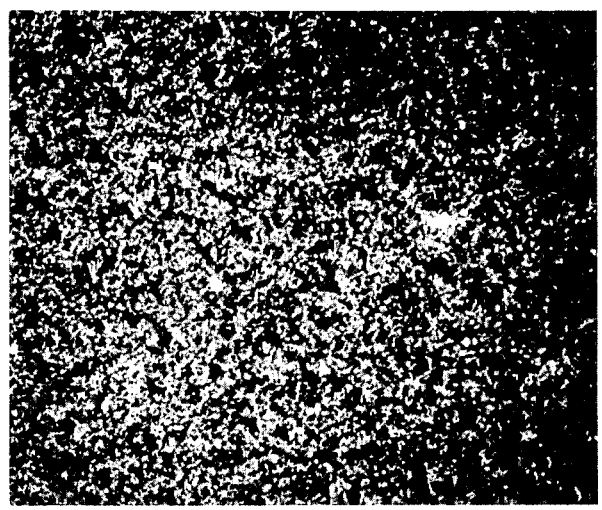

Similarly, the SEM photographs of FIGS. 4, 5, 6, and 7 illustrate the effectiveness of the present invention in modifying the surface finish of a magnetic recording disk employing a polyurethane binder system. The improved surface finish of the polyurethane surface treated in accordance with this invention shown in FIG. 7, as compared to the polyurethane surface in FIG. 5 prior to such treatment, is quite apparent from original photographs submitted with this application. FIGS. 5 and 7 were taken at a magnification ten times that of corresponding FIGS. 4 and 6, respectively.

It should be obvious to one skilled in the art that this invention includes within its scope various kinds of magnetic particles suitable for dispersion and coating onto a disk surface; hard particles, for improved durability such as $Al_2O_3$, SiC, $TiO_2$, and resin binders of which epoxies and polyurethanes are typical examples and substrates which include both metal and plastic.

Outstanding points of this technique, when applied to magnetic disk coatings, are:

1. It greatly improves the wear resistance of the magnetic coating by an order of magnitude, and may even provide the potential for use of unlubed surfaces (an important goal for future disk design).
2. It is a very simple process which in one step yields far superior wear resistance and magnetic performance, excellent surface finish, and curing of the resin.
3. It achieves a very high surface ultrafinish by surface deformation only, without stock removal. Thus, no debris is generated on the disk surface, in contrast to conventional disk polishing operations. The planarity in preliminary tests is close to 2–4 $\mu$m as determined by Talystep measurements.
4. It densifies the epoxy coating by compression which thus becomes harder and less porous. Also, contrary to a disk polishing process in which approximately half of the coating is removed, the amount of $Fe_2O_3$ particles in a coating treated in accordance with this invention is greater than that of a conventionally polished coating. One measure of the amount of magnetic particles in a magnetic coating is the pigment volume concentration (PVC) which is a measure of the volume of magnetic particles or pigment in the coating relative to the total coating volume, higher PVC values being preferred for improved magnetic recording properties of the coating. Significantly higher PVC values of up to 50% may be achieved through this process compared to the typical value of 25–35% in current disks.

A key feature of the present invention is the manufacture of a coating containing $Al_2O_3$ or other hard particles by compressing the coating between two conical rollers, the coating and the rollers rotating at the same angular velocity. When applied to magnetic recording disks, this produces a surface finish superior to polished disks, with unexpectedly high physical and mechanical properties as shown by durability tests, and improved magnetic properties as measured by PVC and signal-to-noise ratio.

What is claimed is:

1. A method for producing an improved magnetic recording disk comprising the steps of:

applying a curable liquid magnetic coating material to a substrate, said coating material containing magnetic particles and load bearing particles, at least some of said load bearing particles extending above the surface of said coating material, placing said coated substrate between a pair of rollers, said rollers having an ultra-smooth surface finish, the hardness of the surfaces of said rollers exceeding the hardness of the surface of said coating material, said magnetic particles and said substrate, rotating both said rollers at the same speed to cause the substrate to be moved at said same speed through the rollers without longitudinal deformation, and applying through said rollers a force to said coated substrate which exceeds the elastic limit of said coating material, the application of said force pushing said protruding load bearing particles into said coating material and substrate to increase its durability;

the application of said force also improving the surface finish of said coating material and also permanently compressing said coating material to increase the concentration of said magnetic particles in said coating material.

2. A method in accordance with claim 1 in which said force is applied simultaneously to coating material on both sides of said substrate.

3. A method in accordance with claim 1 including the step of heating said rollers during rolling of said coating material to at least partially cure said coating material during said rolling.

4. A method in accordance with claim 1 in which said coating material contains a polyurethane binder system.

5. A method in accordance with claim 1 in which said coating material contains an epoxy/phenolic binder system.

6. A method in accordance with claim 1 in which said load bearing particles are $Al_2O_3$.

7. A method for producing an improved magnetic recording disk comprising the steps of:

applying a curable liquid magnetic coating material to a substrate, said coating material containing magnetic particles and load bearing particles, at least some of said load bearing particles extending above the surface of said coating material, placing said coated substrate between a pair of conical rollers, said rollers having an ultra-smooth surface finish, the hardness of the surfaces of said rollers exceeding the hardness of the surface of said coating material, said magnetic particles and said substrate, rotating said rollers to cause rotation of the substrate synchronously with and at the same angular velocity as said rollers, and applying through said rollers a force to said coated substrate which exceeds the elastic limit of said coating material, the application of said force pushing said protruding load bearing particles into said coating material and substrate to increase its durability;

the application of said force also improving the surface finish of said coating material and also permanently compressing said coating material to increase the concentration of said magnetic particles in said coating material.

* * * * *